US012699841B1

(12) United States Patent
Ben Shoham et al.

(10) Patent No.: US 12,699,841 B1
(45) Date of Patent: Aug. 4, 2026

(54) IMPORTANCE AWARE SELECTIVE CORRECTION FOR SPECULATIVE DECODING IN LARGE MODELS

(71) Applicant: Intuit Inc., Mountain View, CA (US)

(72) Inventors: Ofir Ben Shoham, Petah Tikva (IL); Sagiv Antebi, Petah Tikva (IL); Shai Ardazi, Petah Tikva (IL); Gad Markovits, Petah Tikva (IL)

(73) Assignee: Intuit Inc., Mountain View, CA (US)

( * ) Notice: Subject to any disclaimer, the term of this patent is extended or adjusted under 35 U.S.C. 154(b) by 0 days.

(21) Appl. No.: 19/341,760

(22) Filed: Sep. 26, 2025

(51) Int. Cl.
*G06F 40/284* (2020.01)
*G06F 40/40* (2020.01)
*G06N 3/0499* (2023.01)

(52) U.S. Cl.
CPC ............ *G06F 40/284* (2020.01); *G06F 40/40* (2020.01); *G06N 3/0499* (2023.01)

(58) Field of Classification Search
CPC ...... G06F 40/284; G06F 40/40; G06N 3/0499
See application file for complete search history.

(56) References Cited

U.S. PATENT DOCUMENTS

2024/0296294 A1* 9/2024 Imani .................. G06F 16/3329

OTHER PUBLICATIONS

Garipov, AutoJudge: Judge Decoding Without Manual Annotation, 2025, arXiV, whole document (Year: 2025).*
Pham, Get 3× Faster LLM Inference with Speculative Decoding Using the Right Draft Model, 2025 BentoML (website), whole page (Year: 2025).*
Leviathan, Y., et al., "Fast Inference from Transformers via Speculative Decoding", May 18, 2023, 13 pages.
Timor, N., et al., "Accelerating LLM Inference with Lossless Speculative Decording Algorithms for Heterogeneous Vocabularies", Jun. 11, 2025, 23 pages.

* cited by examiner

*Primary Examiner* — Sonia L Gay
(74) *Attorney, Agent, or Firm* — Lathrop GPM LLP

(57) ABSTRACT

Importance aware selective correction for speculative decoding in large models include obtaining, via a prompt interface, an input prompt to a large model (LM) and intercepting the input prompt by a draft model. The draft model generates a set of output tokens in response to the input prompt. The LM may accept or reject the set of output tokens. A pivotal model classifies the set as trivial or pivotal. If trivial, the set of output tokens are transmitted on a communications network based on being classified as trivial regardless being rejected. If pivotal, then the LLM regenerates the set and the regenerated set is transmitted.

15 Claims, 5 Drawing Sheets

400

| CONTEXT | DRAFT TOKEN | LM AGREEMENT | PIVOTAL MODEL | ACTION |
|---|---|---|---|---|
| "The game was" | "great" | ✓ Yes | — | Accept Token |
| "The game was great" | "." | ✗ No | Trivial | Accept Token |
| "The game was" | "boring" | ✗ No | Pivotal | Regenerate with LM |

500
Computing
System

512
Output Device(s)

504
Non-Persistent
Storage

502
Computer
Processor(s)

506
Persistent
Storage

508
Communication
Interface

510
Input Device(s)

520
Network

522
Node X

•••

524
Node Y

526
Client Device

IMPORTANCE AWARE SELECTIVE CORRECTION FOR SPECULATIVE DECODING IN LARGE MODELS

BACKGROUND

Large models (LMs) have revolutionized natural language processing (NLP) by enabling machines to generate text that closely resembles human language based on predicting the next token in a sequence. Besides NLPs, LMs are used in a variety of applications including image analysis, speech decoding, video analysis, etc. A LM's performance is the LM's ability to produce accurate and coherent output. However, the performance comes at a cost in terms of processor usage to execute processing cycles and memory usage to store the LM. Because of the large volume of input prompts to the LM, the execution of the LM on each input prompt results in significant computing resource usage.

To address this challenge, speculative decoding may be used. Speculative decoding involves a smaller draft model speculatively predicting the output of the LM. Namely, the draft model is a smaller probabilistic model than the LM. The draft model generates output from an input prompt. Under speculative decoding, the usage of the LM is only to validate the output of the draft model. Namely, because the draft model is small, the output of the draft model is more likely to be incorrect than the output of the LM. Thus, the LM validates the output for correctness. If the LM rejects the output, then the LM generates new output from the input prompt.

The processing resource usage of the draft model when the output is accepted saves on the processing of the full LM. However, when the output is rejected, then the amount of resource usage is the processing of both the draft model and the full LM. Thus, a continued challenge exists in how to minimize the resource usage to execute the various machine learning models of a system.

SUMMARY

In general, in one aspect, one or more embodiments relate to a method that includes obtaining, via a prompt interface, an input prompt to a large model (LM), intercepting the input prompt by a draft model, and processing, by the draft model, the input prompt to generate a set of output tokens in response to the input prompt. The method also includes the LM performing a verification of the set of output tokens to reject the set of output tokens. The method also includes a pivotal model processing the set of output tokens classify the set of output tokens as trivial, and transmitting, as a part of a response to the input prompt, the set of output tokens on a communications network based on the set of output tokens being classified as trivial regardless of the set of output tokens being rejected by the LM.

In general, in one aspect, one or more embodiments relate to a system that includes at least one computer processor. The system also includes a draft model executing on the at least one computer processor and configured to intercept an input prompt and process the input prompt to generate a set of output tokens in response to the input prompt. The system also includes a large model (LM) executing on the at least one computer processor and configured to perform a verification of the set of output tokens to reject the set of output tokens. The system also includes the pivotal model executing on the at least one computer processor and configured to process the set of output tokens classify the set of output tokens as trivial. The system also includes a prompt interface executing on the at least one computer processor and configured to obtain an input prompt to a language model, transmit, as a part of a response to the input prompt, the set of output tokens on a communications network based on the set of output tokens being classified as trivial regardless of the set of output tokens being rejected by the LM.

In general, in one aspect, one or more embodiments relate to a method that includes obtaining, via a prompt interface, an input prompt to a large model (LM), intercepting the input prompt by a draft model, processing, by the draft model, the input prompt to generate a first set of output tokens, a second set of output tokens, and a third set of tokens in response to the input prompt. The method also includes performing, by the LM, a verification of the first set of output tokens to reject the first set of output tokens, processing, by a pivotal model, the first set of output tokens classify the first set of output tokens as trivial, and transmitting, as a first part of a response to the input prompt, the first set of output tokens on a communications network based on the first set of output tokens being classified as trivial regardless of the first set of output tokens being rejected by the LM. The method also includes performing, by the LM, the verification of the second set of output tokens to reject the second set of output tokens, processing, by the pivotal model, the second set of output tokens classify the second set of output tokens as pivotal, regenerating, by the LM, the second set of output tokens responsive to the second set of output tokens being rejected by the LM and being marked as pivotal by the pivotal model to generate a set of revised output tokens, and transmitting, as a second part of a response to the input prompt, the set of revised output tokens on the communications network. The method also includes performing, by the LM, the verification of the third set of output tokens to accept the first set of output tokens, and transmitting, as a first part of a response to the input prompt, the first set of output tokens on the communications network based on the first set of output tokens being accepted by the LM.

Other aspects of one or more embodiments will be apparent from the following description and the appended claims.

BRIEF DESCRIPTION OF DRAWINGS

FIG. 4 shows an example in accordance with one or more embodiments.

Like elements in the various figures are denoted by like reference numerals for consistency.

DETAILED DESCRIPTION

When performing speculative decoding to improve inference time, a fast draft model proposes the next tokens and a slower large model verifies or corrects them, so sometimes tokens can be accepted immediately, and large model (LM) generation is only invoked occasionally dramatically cutting average latency compared with generating every token with the large model.

Because every mismatch triggers token generation with the LM, the system still spends the same compute and latency on all mismatched tokens, even when the draft model's error falls on a semantically minor token such as a common stop-word (e.g., "the", "and"), punctuation, an auxiliary verb ("is", "was"), or a low-impact sub-word piece. As a result, many calls to the LM provide no meaningful quality benefit yet still incur extra latency and cost.

One or more embodiments are directed to minimizing the regeneration of output by a LM using a machine learning system including a pivotal model that operates prior to any regeneration by the LM. The pivotal model determines whether a token in an output is trivial or pivotal to the output. A trivial token is a token whose value does not materially change the output. A pivotal token is a token that significantly impacts the meaning and correctness of the generated output. Whether a token is trivial or pivotal is used to selectively regenerate incorrect output by the LM.

More specifically, an input prompt is received by a system. The draft model intercepts the input prompt and generates a set of output tokens. The set of output tokens includes one or more tokens in a series. The LM determines, accepts, or rejects the set of output tokens based on the input prompt. A pivotal model determines whether the output tokens are pivotal or trivial. The set of output tokens are regenerated by the LM only when both the set of output tokens are rejected and pivotal. If the set of output tokens are trivial, then even though the set of output tokens are rejected, the set of output tokens are not regenerated. By not regenerating the set of output tokens when trivial, embodiments save on computing resource usage of the LM.

Figure 1:
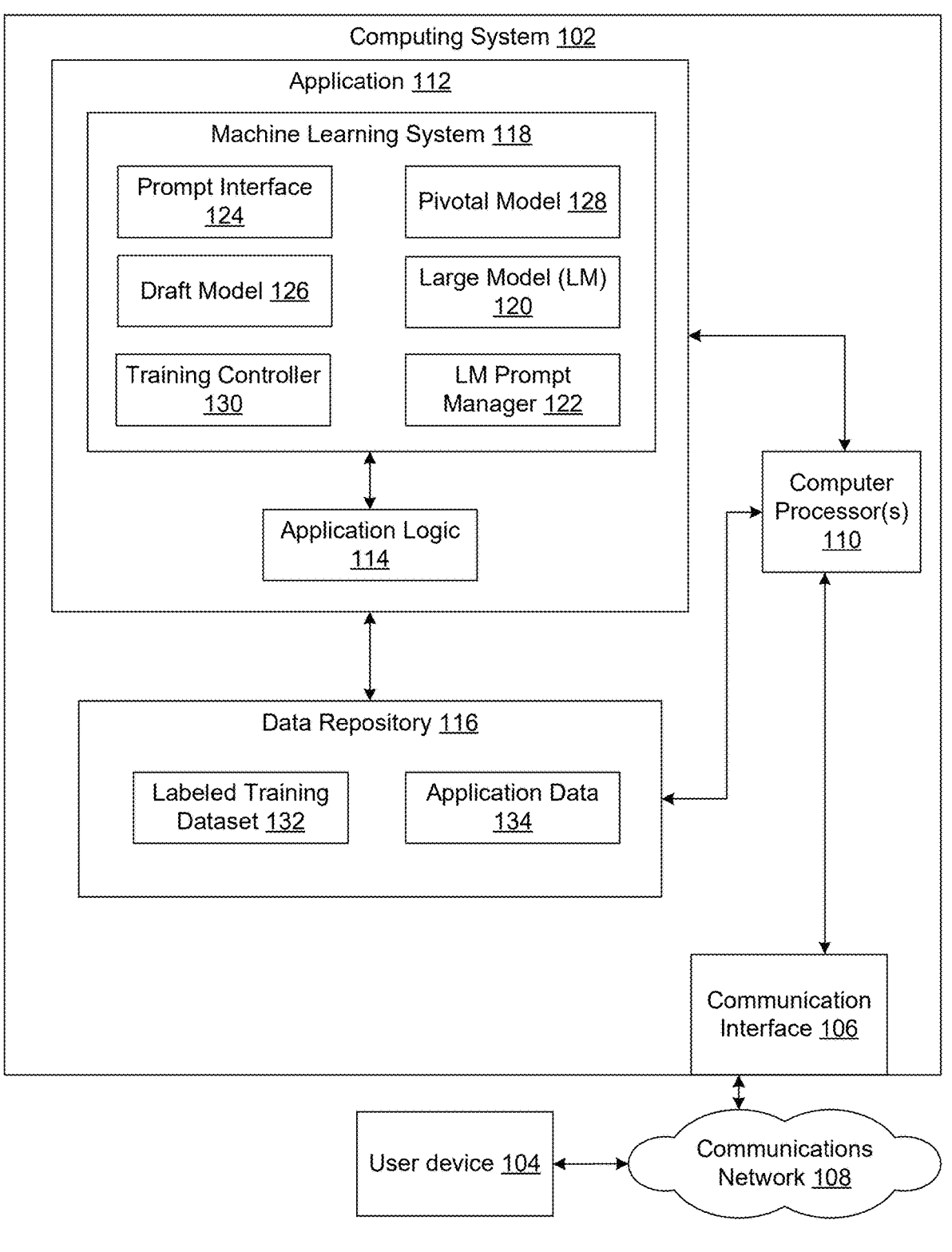
FIG. 1 shows a system in accordance with one or more embodiments.

Turning to FIG. 1, FIG. 1 shows a diagram of a system in accordance with one or more embodiments. As shown in FIG. 1, the system includes a computing system (102) is shown in accordance with one or more embodiments. The computing system (102) may correspond to the computing system shown in FIGS. 5A and 5B with one or more computer processors (110). The computing system (102) is configured to interface with a user device (104) via a communication interface (106) and a communications network (108). The communication interface (106) may include a hardware or software interface (e.g., network interface card, networking stack) that is configured to transmit information over the communications network (108). The communications network (108) may be the Internet, an internal network, or another network. A user device (104) is a device that may be used by a user. For example, a user device may be the computing system shown in FIG. 5A and FIG. 5B. The user device (104) is directly or indirectly connected to the computing system (102).

The computing system (102) may be controlled by a single entity or multiple entities. The computing system (102) includes an application (112) with a machine learning system (118) connected to a data repository (116).

The application (112) is a software application that is configured to interact directly or indirectly with a user. For example, the application may be a web application, a local application on the user device, or another application. The application (112) may be dedicated to being an intermediary between the user device (104) and the machine learning system (118) or may be a standalone application that uses the features of the machine learning system (118) to perform specific functionality for the user. The machine learning system (118) may be part of the application (112) as shown or may be separate from and used by multiple applications (112).

For example, the application (112) may be all or a portion of a program providing specific functionality, a web service, or another type of program. By way of an example, the application (112) may be a chat program or help program to provide a user with assistance in performing a task. As another example, the application (112) may be a dedicated application, such as a word processing application, spreadsheet application, presentation application, financial application, healthcare application, or any other software application, that may use the LM to respond to the user. The application (112) includes application logic (114) connected to the machine learning system (118). The application logic (114) is a set of instructions of the application (112) that provides the functionality of the application (112).

The machine learning system (118) includes an LM (120). The LM (120) complies with the standard definition used in the art. A LM in machine learning refers to a model that significantly exceeds standard machine learning models in terms of scale, complexity, and capacity. Specifically, the LM is defined by having millions or more parameters (e.g., can be in the hundreds of millions to billions of parameters), which cause the LM to learn and represent highly complex patterns in data. LM therefore uses substantial computational resources for training and inference and are often trained on massive datasets. An example of a LM is a large language model. However, the LM may be configured to perform tasks beyond language, such as image classification. Specifically, the LM (120) has millions or more parameters and is generally trained on large quantities of unlabeled text using self-supervised learning or semi-supervised learning. The LM (120) can understand natural language and generate text and possibly other forms of content. Examples of LMs include the GPT-5® model and Open AI O3 from OpenAI company, LLAMA® from Meta, and GEMINI® from Google.

The LM prompt manager (122) is a software component that is configured to act as an intermediary between the user device (104) and the LM (120). Specifically, the LM prompt manager (122) is configured to obtain a user prompt from a user via a prompt interface (124) and interact with other components of the machine learning system (118). The LM prompt manager may be configured to update the user prompt to generate an input prompt; interface with the draft model (126), pivotal model (128), and the LM (120); and provide a user response to the user based on the user prompt. The user prompt is any prompt that is received by the LM prompt manager (122), directly or indirectly, from the user device (104) for processing. For example, the user prompt may be a query or a set of one or more instructions for generating a response. The user response is the response that is directly or indirectly transmitted to the user device (104).

The draft model (126) is a machine learning model that is configured to probabilistically generate sets of output tokens based on input. Output tokens are individual words or terms in the response from the machine learning system (118). Each set of output tokens may have one or more output tokens. If multiple output tokens are included in the set, then the multiple output tokens are arranged in a series that is ordered. Further, the sets of output tokens are ordered amongst the set. The draft model (126) operates based on probability distributions of an internal dictionary of terms. The probability distribution is the posterior probability given to the input prompt. Further, as sets of output tokens are generated for the same input, the sets of output tokens are individually accepted or rejected by the LM (120). The probability distribution is the posterior probability based on the input prompt and whether the prior sets of output tokens are accepted or rejected.

The pivotal model (128) is a machine learning model that is configured to determine whether the set of output tokens are trivial or pivotal to the response. If changing a term alters the outcome of the mathematical answer or unit test, it may be deemed likely that the term is pivotal, otherwise the term is trivial. For example, the pivotal model (128) may be a two layer feed forward neural network. The first layer of the feed forward neural network may be configured to generate an intermediate result. The second layer of the feed forward neural network is configured to use, as input, the intermediate result and generate, as output, the classification result. The pivotal model operates on input. The input includes the set of input tokens and context. The context may be the input prompt and the prior sets of input tokens.

A training controller (130) is configured to train the respective machine learning models. The training controller (130) is software or application specific hardware which, when executed by the computer processor (110), trains one or more machine learning models of the machine learning system (118). The machine learning models in the machine learning system may include neural networks. For each layer of a machine learning model, the weights of the layer may be multiplied by the input vector to generate a collection of products, which may then be summed to generate an output for the layer that may be fed, as input data, to a next layer within the machine learning model. The output of the machine learning model may be the output generated from the last layer within the machine learning model. Multiple machine learning models may operate sequentially or in parallel. The output may be a vector or scalar value. The layers within the machine learning model may be different and correspond to different types of models. As an example, the layers may include layers for recurrent neural networks, convolutional neural networks, transformer models, attention layers, perceptron models, etc. Perceptron models may include one or more fully connected (also referred to as linear) layers that may convert between the different dimensions used by the inputs and the outputs of a model. Different types of machine learning algorithms may be used, including regression, decision trees, random forests, support vector machines, clustering, classifiers, principal component analysis, gradient boosting, etc.

The training controller may train the machine learning models of the machine learning system by inputting labeled training dataset (132) to a machine learning model to generate training outputs that are compared to expected outputs. For supervised training, the expected outputs may be labels associated with a given input. The difference between the training output and the expected output may be processed with a loss function to identify updates to the weights of the layers of the model. After training on a batch of inputs, the updates identified by the loss function may be applied to the machine learning model to generate a trained machine learning model. Different algorithms may be used to calculate and apply the updates to the machine learning model, including back propagation, gradient descent, etc.

Continuing with FIG. 1, the application (112) is connected to a data repository (116). The data repository (116) may store data associated with the computing system (102), such as the labeled training dataset (132) and application data (134). The application data (134) includes user data, transmissions, metadata, models, outputs, sequences, tokens, input text candidates, resultant texts, LM output context information, perplexity scores, pivotal tokens, terms, sentences, thresholds, coherence values, vocabularies, preferred responses, prompts, training data, DPO pairs, loss values, metrics, features, predictions, likelihoods, and labels, among other information. The application data (134) may also include machine learning system information such as text input history, prompt history, reasoning, dense vectors (e.g., capturing nuanced relationships between prompts and outputs), tokenization metadata (e.g., token-level representations with token strings, positions, and/or byte-pair encoding (BPE) IDs or other tokenizer IDs), latent representations (i.e., hidden states or contextual embeddings extracted from one or more layers of the LM), generated output and ranking metadata (e.g., log-probabilities, beam scores, sampling temperatures, decoding parameters, or the like), task-specific annotations or features (e.g., target words, term or sentence context, syntactic roles, semantic roles, dependency tree information, or the like), or any other suitable information that enables the computing system (102) to reuse and trace context across multiple NLP-related tasks, such as generating substitute (or "candidate") tokens, determining perplexity scores, and the like.

In various implementations, the data repository (116) may store vectorized embeddings or other high-dimensional representations and associated feature vectors in a vector space, such as to enable efficient similarity searches, clustering, and advanced AI analytics. In such implementations, portions of the data repository (116) may incorporate aspects of a vector data repository or be embedded in a multi-data repository architecture that enables proximity metrics and vector space computations.

While FIG. 1 shows a configuration of components, other configurations may be used without departing from the scope of one or more embodiments. For example, various components may be combined to create a single component. As another example, the functionality performed by a single component may be performed by two or more components.

Figure 2:
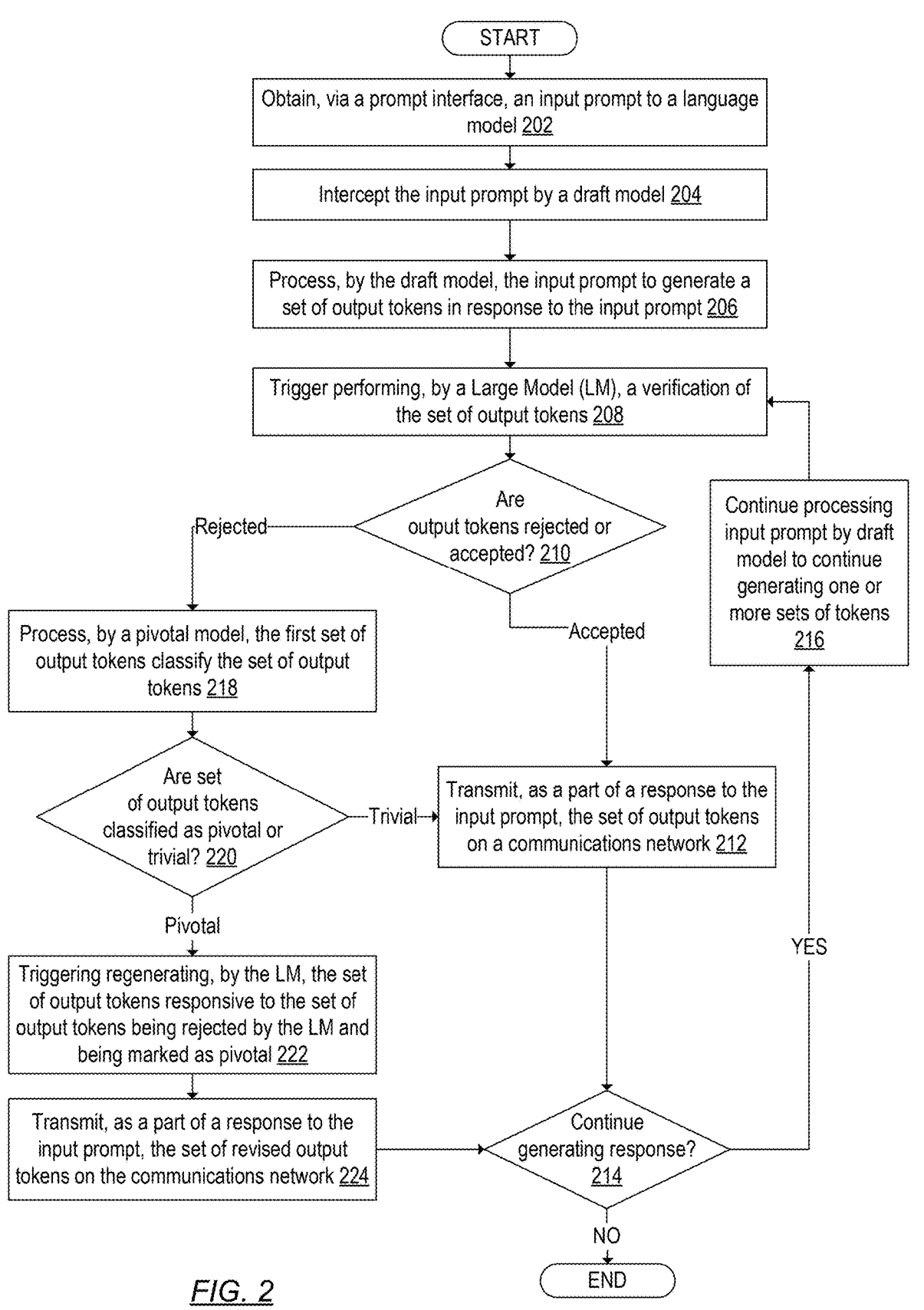
FIG. 2 shows a flowchart in accordance with one or more embodiments.

FIG. 2 shows a flowchart of a method in accordance with one or more embodiments. The method of FIG. 2 may be implemented using the system of FIG. 1 and one or more of the steps may be performed on or received at one or more computer processors. While the various steps in this flowchart are presented and described sequentially, at least some of the steps may be executed in different orders, may be combined or omitted, and at least some of the steps may be executed in parallel. Furthermore, the steps may be performed actively or passively.

Block 202 includes obtaining, via a prompt interface, an input prompt to a language model. The input prompt may be received directly from the user device via the prompt interface or may be received via the application. For example, a user may input a query into a chat interface of an application. As another example, the input prompt may be generated by the application, such as part of an agentic workflow of the application. In the example, the input prompt may be generated by the application to request functionality of the application. The input prompt is passed to the machine learning system. The machine learning system may augment the input prompt with user data and other contextual information for processing by the LM.

Block 204 includes intercepting the input prompt by a draft model. Rather than the input prompt being transmitted to the LM, the input prompt is rerouted to the draft model. Thus, the draft model processes the input prompt instead of the LM.

Block 206 includes processing, by the draft model, the input prompt to generate a set of output tokens in response to the input prompt. The draft model has a smaller dictionary of terms than the LM, thereby using fewer computing resources than the large LM. Further, the draft model may probabilistically determine sets of output tokens given the input prompt based on probability distributions of the output tokens. The output of the draft model is in sets of output tokens. Each set of output tokens is a series of one or more tokens of output. For example, each set may have two to four terms of the response. Thus, the full response as generated by the draft model is sets of output tokens whereby each set is ordered amongst the sets and each set has an ordered series of tokens.

Block 208 includes triggering performing, by the LM, a verification of the set of output tokens. Triggering the performing of the verification may include transmitting a prompt to the LM. The LM is a significantly larger model than the draft model. However, rather than the LM operating on the full dictionary of the LM to determine the probability of each term in the full dictionary being accurate in the output, the LM only determines the probability of each term in the set of output tokens being accurate based on the context of the input prompt and prior processed sets of tokens for the input prompt. The LM may further use prior input prompts from the same session with the user as context. Because the LM only determines the probability of the set of output tokens, the verification by the LM is significantly faster than the LM operating to generate the response directly from the input prompt.

Block 210 includes determining whether the output tokens rejected or accepted. The result of processing by the LM is a verification signal of accepted or rejected. The verification signal is a binary value. The verification signal may be transmitted to the draft model to use as context for generating the next set of output tokens. Further, the verification signal is transmitted to other components of the machine learning system. If the output tokens are accepted, the flow proceeds to Block 212.

Block 212 includes transmitting, as a part of a response to the input prompt, the set of output tokens on a communications network. If the LM accepts the set of output tokens, then the set of output tokens becomes part of the response. Block 212 may include, for example, the set of output tokens being transmitted to an output buffer and then being transmitted on the communications network to a user device. The set of output tokens may be transmitted to application logic for further processing. In some cases, the full response is generated prior to transmitting the set of output tokens. In such a scenario, the set of output tokens are appended to the end of the current response, and the response is transmitted after completion on the communications network.

Block 214 includes determining whether to continue generating a response. Specifically, the operations of Block 214 include determining whether the response is complete. If the response is not complete, then the processing continues with Block 216, otherwise the processing proceeds to end with the current response.

Block 216 includes continuing the processing of the input prompt by a draft model to continue generating one or more sets of tokens. After generating a set of output tokens, the draft model starts generating the next set. The acceptance or rejection of the prior set may be used to affect the probability distribution of the next set. Further, the context in the prior sets that are generated may be used to affect the probability distribution of the terms in the next set.

Returning to Block 212, the LM may transmit a verification signal indicating the rejection directly or indirectly to the pivotal model. After outputting the set of output tokens by the draft model, the pivotal model may execute in Block

218. Block 218 includes processing, by a pivotal model, the first set of output tokens classifying the set of output tokens. The processing in Block 218 may be performed only after the set of output tokens are rejected. As another example, processing of Block 218 may be performed prior to Block 208. As another example, the processing of Block 218 may be performed concurrently with Block 208.

The pivotal model executes on the set of tokens using the input prompt and the prior set or sets of output tokens as context. For example, the context may be the current response and the input prompt as a vector embedding. By way of an example, for the initial set of output tokens, the context may be a vector embedding of the input prompt. After the initial set of output tokens, the context may be a hidden state of prior execution of the pivotal model for the input prompt. The context may be concatenated with a vector embedding of the set of output tokens to generate a vector representation. Then, executing the pivotal model includes executing a first layer on a feed forward neural network to generate an intermediate vector, and executing a second layer of the feed forward neural network on the intermediate vector to generate a classification result. The classification result may be that the set of output tokens are trivial or pivotal. The execution of the pivotal model is quicker as the pivotal model is a small model. Thus, the amount of computing resources used by executing the pivotal model is minimal.

Block 220 includes determining whether the set of output tokens are classified as pivotal or trivial. Specifically, the determination is made whether the classification result indicates that the set of output tokens are trivial or indicates that the set of output tokens are pivotal. If the set of output tokens are classified as trivial, the flow proceeds to Block 212 as described above. Namely, regardless of whether the LM rejects the set of output tokens, the set of output tokens are transmitted on the communications network because of the triviality. Namely, the meaning of the response does not significantly change. If the set of output tokens are classified as pivotal, the flow proceeds to Block 222.

Block 222 includes triggering regenerating, by the LM, the set of output tokens responsive to the set of output tokens being rejected by the LM and being marked as pivotal. Triggering the regenerating may include transmitting a prompt to the LM. When the set of output tokens are pivotal, then the LM processes the input prompt to generate a set of revised output tokens. The draft model has the context until the current point (e.g., the user question and also the initial response up to the rejected tokens). From the current point and using the context, the draft model may regenerate only the number of rejected tokens. The set of revised output tokens may have one or more output tokens modified or changed from the set of output tokens generated by the draft model.

Block 224 includes transmitting, as a part of a response to the input prompt, the set of revised output tokens on the communications network. The set of revised output tokens may be transmitted in a same or similar manner as transmitting the set of output tokens discussed above with reference to Block 212.

The training of the pivotal model may be performed on a set of labeled training documents in a prelabeled training dataset. The set of documents may have several sequences of terms. Each term in the sequence is prelabeled with the pivotal label and the trivial label indicating whether the term is pivotal or trivial, respectively. Each sequence corresponds to an example training set of output tokens. A training response may be a paragraph or other text block of the document. The pivotal model may process each sequence in order of the text block to determine whether to label the terms in the sequence as pivotal or trivial using prior sequences in the text block as context. The difference between the label generated by the pivotal model and the label in the training document is used to generate a loss. The training controller updates the pivotal model based on the loss.

Figure 3:
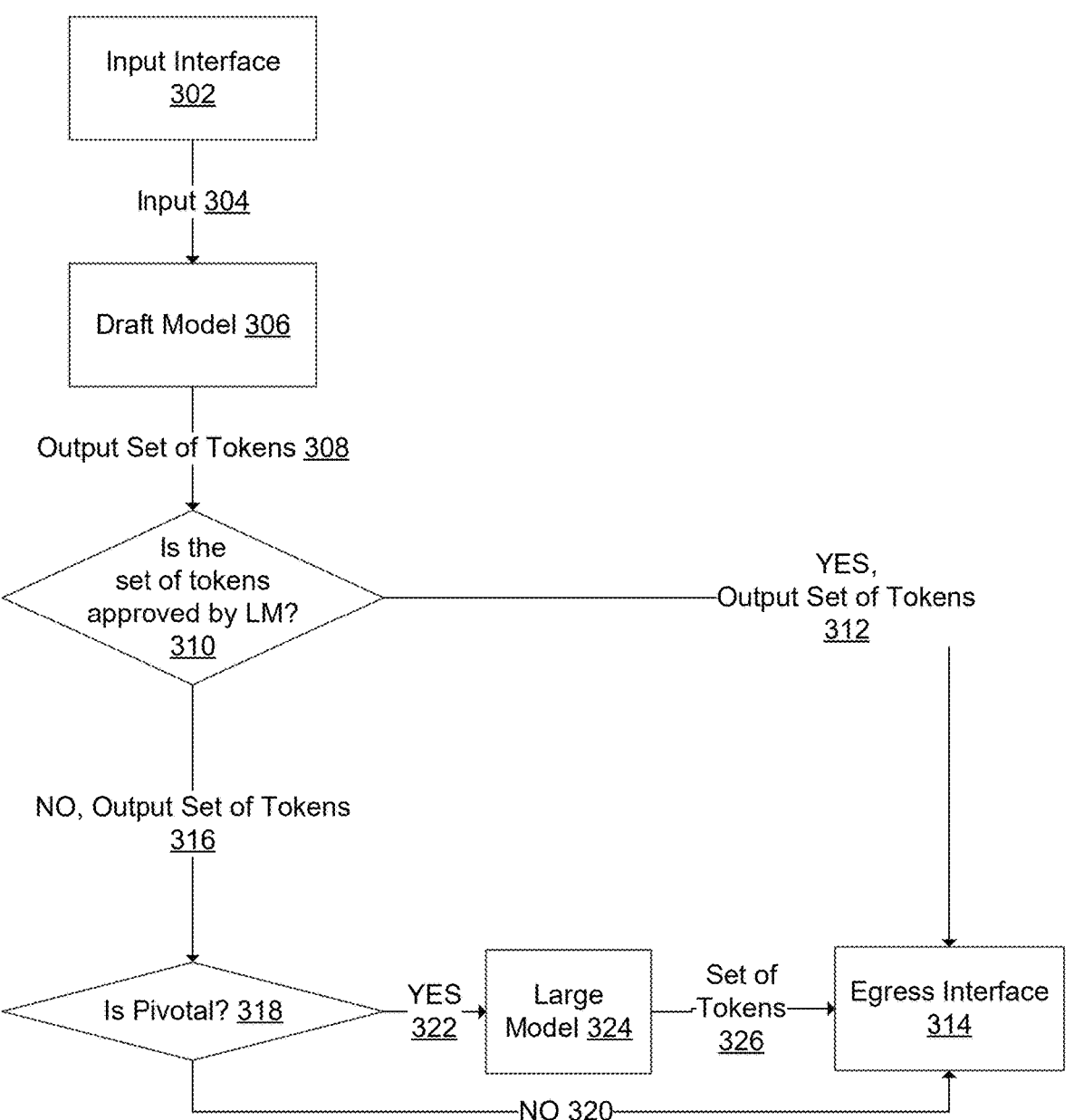
FIG. 3 shows an example flow diagram in accordance with one or more embodiments.

FIG. 3 and FIG. 4 show examples, in accordance with one or more embodiments. The following example is for explanatory purposes only and not intended to limit the scope of one or more embodiments. FIG. 3 shows an example flow diagram in accordance with one or more embodiments. As shown in the example, an input interface (302) provides input (304), which is intercepted by the draft model (306). The draft model generates an output set of tokens (308). A determination is made whether the output set of tokens is approved by the LM (310). If the set of tokens is approved by the LM (312), then the set of tokens is output by the egress interface (314).

If the set of tokens is not approved by the LM (316), then a determination is made whether the set of tokens is pivotal (318). Sets of tokens that are not pivotal (320) are transmitted via the egress interface (314). Sets of tokens that are pivotal (322) and rejected by the LM are passed to the LM (324). The LM (324) regenerates the set of tokens and outputs the regenerated set of tokens (326) on the egress interface (314).

As shown, when the draft model and the LM disagree on a token, instead of invoking the large model for token generation, a tiny importance classifier (e.g., the pivotal model) is queried first. If the importance classifier predicts the token is pivotal to sentence meaning, the machine learning system calls the LM to regenerate the sentence. If the token is non-pivotal, the speculative token is accepted as-is, skipping the costly LM generation. This lightweight mechanism preserves output quality while further reducing latency and computation because expensive corrections are reserved only for impactful tokens.

Once or more embodiments add an importance-aware selective correction mechanism to speculative decoding. For a large corpus, each token is automatically labeled as pivotal or non-pivotal. Tokens whose removal causes a significant degradation are labeled pivotal, others are non-pivotal.

During model training, a compact encoder-only classifier (e.g., a two-layer feed forward network or a tiny transformer with very few parameters) is trained on the labeled dataset to decide whether a token is pivotal. Because this is a simple binary-classification task (encoder-only tiny model and not an LM), the classification is far easier than full next-token generation, because the small model adds only microseconds of latency per query.

For example, the tiny importance classifier adds only a few microseconds of latency per mismatch, yet it eliminates most of the expensive calls to the large model. For example, on the same NVIDIA A100 80 GB SXM card (4-bit quantization), Llama 3-8B draft model executes 133 tokens per second and Llama 3-70 B LM generates 24 tokens per second. However, the importance classifier may process thousands of tokens per second. Therefore, redirecting non-pivotal tokens away from the large model slashes the correction-phase latency and yields a substantial net speed-up.

These new components ensure expensive corrections are reserved only for impactful tokens, yielding extra speed-ups over baseline speculative decoding while preserving output quality.

FIG. 4 shows an example in accordance with one or more embodiments. In the example of FIG. 4, each row of the table (400) corresponds to a new set of tokens in a response. For the first row (402), the context is "the game was" and the token generated by the draft model is "great." The LM accepts the token (i.e., LM agreement column), so the pivotal model does not process the token and the token is accepted.

In the second row (404), the context is "the game was great" and the token generated by the draft model is a period. The LM rejects the token. The pivotal model identifies a period as trivial. Thus, the token is accepted.

In the third row (406), the context is "the game was" and the token generated by the draft model is "boring". The LM rejects the token. The pivotal model identifies the token as pivotal. Thus, the token is regenerated.

Speculative decoding is an inference approach to optimize the inference time of an LM, and the single LM may handle a lot of examples concurrently. As such, humans are unable to process the number of prompts compared to an LM. For example, humans cannot even write the output in the amount of time. While the exact number of prompts that can be handled per minute depends on the hardware (e.g., number of graphics processing units (GPUs)) but can be millions of requests per minute.

In the example, even though the second and third row would otherwise be regenerated by the LM, the pivotal model prevents the computer processor executing the LM from regenerating the token. Thus, the computing resources are saved to perform other tasks including the processing of other prompts. By saving the computing resources, the throughput and responsiveness of the machine learning system is increased.

One or more embodiments may be implemented on a computing system specifically designed to achieve an improved technological result. When implemented in a computing system, the features and elements of the disclosure provide a significant technological advancement over computing systems that do not implement the features and elements of the disclosure. Any combination of mobile, desktop, server, router, switch, embedded device, or other types of hardware may be improved by including the features and elements described in the disclosure.

Figures 5A, 5B:
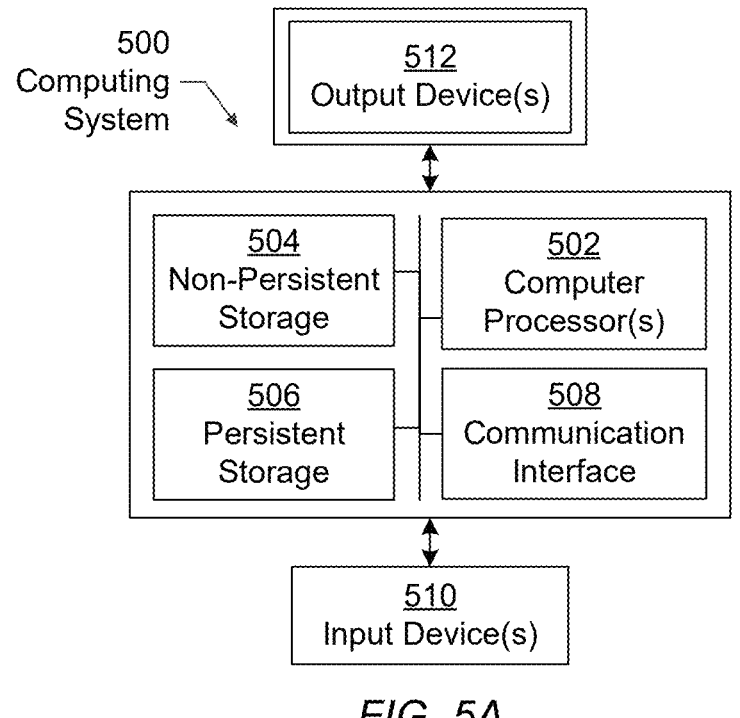
FIG. 5A and FIG. 5B shows a computing system in accordance with one or more embodiments.

For example, as shown in FIG. 5A, the computing system (500) may include one or more computer processor(s) (502), non-persistent storage device(s) (504), persistent storage device(s) (506), a communication interface (508) (e.g., Bluetooth interface, infrared interface, network interface, optical interface, etc.), and numerous other elements and functionalities that implement the features and elements of the disclosure. The computer processor(s) (502) may be an integrated circuit for processing instructions. The computer processor(s) (502) may be one or more cores, or micro-cores, of a processor. The computer processor(s) (502) includes one or more processors. The computer processor(s) (502) may include a central processing unit (CPU), a graphics processing unit (GPU), a tensor processing unit (TPU), combinations thereof, etc.

The input device(s) (510) may include a touchscreen, keyboard, mouse, microphone, touchpad, electronic pen, or any other type of input device. The input device(s) (510) may receive inputs from a user that are responsive to data and messages presented by the output device(s) (512). The inputs may include text input, audio input, video input, etc., which may be processed and transmitted by the computing system (500) in accordance with one or more embodiments. The communication interface (508) may include an integrated circuit for connecting the computing system (500) to a network (not shown) (e.g., a local area network (LAN), a wide area network (WAN) such as the Internet, mobile network, or any other type of network) or to another device, such as another computing device, and combinations thereof.

Further, the output device(s) (512) may include a display device, a printer, external storage, or any other output device. One or more of the output device(s) (512) may be the same or different from the input device(s) (510). The input device(s) (510) and output device(s) (512) may be locally or remotely connected to the computer processor(s) (502). Many different types of computing systems exist, and the aforementioned input device(s) (510) and output device(s) (512) may take other forms. The output device(s) (512) may display data and messages that are transmitted and received by the computing system (500). The data and messages may include text, audio, video, etc., and include the data and messages described above in the other figures of the disclosure.

Software instructions in the form of computer readable program code to perform embodiments may be stored, in whole or in part, temporarily or permanently, on a non-transitory computer readable medium such as a solid state drive (SSD), compact disk (CD), digital video disk (DVD), storage device, a diskette, a tape, flash memory, physical memory, or any other computer readable storage medium. Specifically, the software instructions may correspond to computer readable program code that, when executed by the computer processor(s) (502), is configured to perform one or more embodiments, which may include transmitting, receiving, presenting, and displaying data and messages described in the other figures of the disclosure.

The computing system (500) in FIG. 5A may be connected to, or be a part of, a network. For example, as shown in FIG. 5B, the network (520) may include multiple nodes (e.g., node X (522) and node Y (524), as well as extant intervening nodes between node X (522) and node Y (524)). Each node may correspond to a computing system, such as the computing system shown in FIG. 5A, or a group of nodes combined may correspond to the computing system shown in FIG. 5A. By way of an example, embodiments may be implemented on a node of a distributed system that is connected to other nodes. By way of another example, embodiments may be implemented on a distributed computing system having multiple nodes, where each portion may be located on a different node within the distributed computing system. Further, one or more elements of the aforementioned computing system (500) may be located at a remote location and connected to the other elements over a network.

The nodes (e.g., node X (522) and node Y (524)) in the network (520) may be configured to provide services for a client device (526). The services may include receiving requests and transmitting responses to the client device (526). For example, the nodes may be part of a cloud computing system. The client device (526) may be a computing system, such as the computing system shown in FIG. 5A. Further, the client device (526) may include or perform all or a portion of one or more embodiments.

The computing system of FIG. 5A may include functionality to present data (including raw data, processed data, and combinations thereof) such as results of comparisons and other processing. For example, presenting data may be accomplished through various presenting methods. Specifically, data may be presented by being displayed in a user interface, transmitted to a different computing system, and stored. The user interface may include a graphical user interface (GUI) that displays information on a display device. The GUI may include various GUI widgets that organize what data is shown, as well as how data is presented to a user. Furthermore, the GUI may present data directly to the user, e.g., data presented as actual data values through text, or rendered by the computing device into a visual representation of the data, such as through visualizing a data model.

As used herein, the term "connected to" contemplates multiple meanings. A connection may be direct or indirect (e.g., through another component or network). A connection may be wired or wireless. A connection may be a temporary, permanent, or a semi-permanent communication channel between two entities.

The various descriptions of the figures may be combined and may include, or be included within, the features described in the other figures of the application. The various elements, systems, components, and steps shown in the figures may be omitted, repeated, combined, or altered as shown in the figures. Accordingly, the scope of the present disclosure should not be considered limited to the specific arrangements shown in the figures.

In the application, ordinal numbers (e.g., first, second, third, etc.) may be used as an adjective for an element (i.e., any noun in the application). The use of ordinal numbers is not to imply or create any particular ordering of the elements, nor to limit any element to being only a single element unless expressly disclosed, such as by the use of the terms "before," "after," "single," and other such terminology. Rather, ordinal numbers distinguish between the elements. By way of an example, a first element is distinct from a second element, and the first element may encompass more than one element and succeed (or precede) the second element in an ordering of elements.

Further, unless expressly stated otherwise, the conjunction "or" is an inclusive "or" and, as such, automatically includes the conjunction "and," unless expressly stated otherwise. Further, items joined by the conjunction "or" may include any combination of the items with any number of each item, unless expressly stated otherwise.

In the above description, numerous specific details are set forth in order to provide a more thorough understanding of the disclosure. However, it will be apparent to one of ordinary skill in the art that the technology may be practiced without these specific details. In other instances, well-known features have not been described in detail to avoid unnecessarily complicating the description. Further, other embodiments not explicitly described above can be devised which do not depart from the scope of the claims as disclosed herein. Accordingly, the scope should be limited only by the attached claims.

What is claimed is:

1. A method comprising:
obtaining, via a prompt interface, an input prompt to a large model (LM);
intercepting the input prompt by a draft model;
processing, by the draft model, the input prompt to generate a first set of output tokens in response to the input prompt;
triggering performing, by the LM, a verification of the first set of output tokens to reject the first set of output tokens;
processing, by a pivotal model, the first set of output tokens to classify the first set of output tokens as trivial; and transmitting, as a first part of a response to the input prompt, the first set of output tokens on a communications network based on the first set of output tokens being classified as trivial regardless of the first set of output tokens being rejected by the LM;

further processing, by the draft model after generating the first set of output tokens, the input prompt to generate a second set of output tokens in response to the input prompt;

triggering performing, by the LM, a verification of the second set of output tokens to reject the second set of output tokens;

processing, by the pivotal model, the second set of output tokens using a context vector encoding a plurality of prior sets of output tokens, wherein processing the second set of output tokens classifies the second set of output tokens as pivotal, and wherein the plurality of prior sets comprises the first set of output tokens;

triggering regenerating, by the LM, the second set of output tokens responsive to the second set of output tokens being rejected by the LM and being marked as pivotal by the pivotal model to generate a set of revised output tokens; and transmitting, as a second part of the response to the input prompt, the set of revised output tokens on the communications network.

2. The method of claim 1, wherein the first set of output tokens comprises a series of output tokens.

3. The method of claim 2, wherein the pivotal model processes the series of the output tokens in order to maintain a context of each token within the series.

4. The method of claim 1, wherein each output token of the first set of output tokens is an individual term in the response to the input prompt.

5. The method of claim 1, wherein the processing the first set of output tokens by the pivotal model is performed responsive to the LM rejecting the first set of output tokens.

6. The method of claim 1, wherein the processing by the pivotal model comprises:

executing a first layer on a feed forward neural network to generate an intermediate vector; and executing a second layer of the feed forward neural network on the intermediate vector to generate a classification result, wherein the classification result identifies the first set of output tokens as trivial.

7. The method of claim 1, further comprising:

training the pivotal model on a prelabeled training dataset comprising a training document, wherein the training document comprises a pivotal label and a trivial label for each term of a plurality of terms in the training document.

8. A system comprising:

at least one computer processor;

a draft model executing on the at least one computer processor and configured to:

intercept an input prompt, process the input prompt to generate a first set of output tokens in response to the input prompt, and further process, after generating the first set of output tokens, the input prompt to generate a second set of output tokens in response to the input prompt;

a Large Model (LM) executing on the at least one computer processor and configured to:

perform a verification of the first set of output tokens to reject the first set of output tokens, perform a verification of the second set of output tokens to reject the second set of output tokens, and regenerate the second set of output tokens responsive to the second set of output tokens being rejected by the LM and being marked as pivotal by a pivotal model to generate a set of revised output tokens;

the pivotal model executing on the at least one computer processor and configured to:

process the first set of output tokens to classify the first set of output tokens as trivial, and process the second set of output tokens using a context vector encoding a plurality of prior sets of output tokens, wherein processing the second set of output tokens classifies the second set of output tokens as pivotal, and wherein the plurality of prior sets comprises the first set of output tokens; and a prompt interface executing on the at least one computer processor and configured to:

obtain the input prompt to a language model, transmit, as a first part of a response to the input prompt, the first set of output tokens on a communications network based on the first set of output tokens being classified as trivial regardless of the first set of output tokens being rejected by the LM, and transmit, as a second part of the response to the input prompt, the set of revised output tokens on the communications network.

9. The system of claim 8, wherein the first set of output tokens comprises a series of output tokens.

10. The system of claim 8, wherein each output token of the first set of output tokens is an individual term in the response to the input prompt.

11. The system of claim 8, wherein the processing the first set of output tokens by the pivotal model is performed responsive to the LM rejecting the first set of output tokens.

12. The system of claim 8, wherein the processing by the pivotal model comprises:

executing a first layer on a feed forward neural network to generate an intermediate vector; and executing a second layer of the feed forward neural network on the intermediate vector to generate a classification result, wherein the classification result identifies the first set of output tokens as trivial.

13. The system of claim 8, further comprising:

a training controller executing on the at least one computer processor and configured to train the pivotal model on a prelabeled training dataset comprising a training document, wherein the training document comprises a pivotal label and a trivial label for each term of a plurality of terms in the training document.

14. A method comprising:

obtaining, via a prompt interface, an input prompt to a large model (LM);

intercepting the input prompt by a draft model;

processing, by the draft model, the input prompt to generate a first set of output tokens, a second set of output tokens, and a third set of tokens in response to the input prompt, wherein the generating the second set of output tokens is performed after the first set of output tokens is output by the draft model, and wherein the generating the third set of output tokens is performed after the second set of output tokens is output by the draft model;

triggering performing, by the LM, a verification of the first set of output tokens to reject the first set of output tokens;

processing, by a pivotal model, the first set of output tokens to classify the first set of output tokens as trivial;

transmitting, as a first part of a response to the input prompt, the first set of output tokens on a communications network based on the first set of output tokens being classified as trivial regardless of the first set of output tokens being rejected by the LM;

triggering performing, by the LM, a verification of the second set of output tokens to reject the second set of output tokens;

processing, by the pivotal model, the second set of output tokens using a context vector encoding a plurality of prior sets of output tokens, wherein processing the second set of output tokens classifies the second set of output tokens as pivotal, and wherein the plurality of prior sets comprises the first set of output tokens;

triggering regenerating, by the LM, the second set of output tokens responsive to the second set of output tokens being rejected by the LM and being marked as pivotal by the pivotal model to generate a set of revised output tokens;

transmitting, as a second part of the response to the input prompt, the set of revised output tokens on the communications network;

performing, by the LM, a verification of the third set of output tokens to accept the first set of output tokens; and transmitting, as a third part of the response to the input prompt, the third set of output tokens on the communications network based on the third set of output tokens being accepted by the LM.

15. The method of claim 14, wherein the first set of output tokens comprises a series of output tokens.

\* \* \* \* \*